United States Patent
Ciccarelli et al.

(10) Patent No.: US 7,772,888 B2
(45) Date of Patent: Aug. 10, 2010

(54) COMMUNICATION SYSTEM FOR CONNECTING SYNCHRONOUS DEVICES THAT ARE UNCORRELATED IN TIME

(75) Inventors: Luca Ciccarelli, Rimini (IT); Luca Magagni, Bologna (IT); Alberto Fazzi, Eindhoven (NL); Roberto Canegallo, Rimini (IT); Roberto Guerrieri, Bologna (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 12/345,479

(22) Filed: Dec. 29, 2008

(65) Prior Publication Data

US 2009/0168938 A1 Jul. 2, 2009

(30) Foreign Application Priority Data

Dec. 31, 2007 (IT) .......................... MI2007A2451

(51) Int. Cl.
  *H03K 19/094* (2006.01)
  *H03K 19/0175* (2006.01)
(52) U.S. Cl. .............................. 326/86; 326/82; 326/90
(58) Field of Classification Search ............. 326/82–83, 326/86, 90
  See application file for complete search history.

(56) References Cited

U.S. PATENT DOCUMENTS 4,723,082 A * 2/1988 Asano et al. ................... 326/81

2007/0092011 A1 4/2007 Ciccarelli et al.
2007/0140397 A1 6/2007 Jaussi et al.
2009/0168860 A1 * 7/2009 Magagni et al. ............. 375/226

OTHER PUBLICATIONS

Banerjee, K. et al., "3-D ICs: A Novel Chip Design for Improving Deep-Submicrometer Interconnect Performance and Systems-on-Chip Integration," Proceedings of the IEEE 89(5):602-633, May 2001.
Drost, R. et al., "Proximity Communication," IEEE Journal of Solid-State Circuits 39(9):1529-1535, Sep. 2004.
Kanda, K. et al., "1.27Gb/s/pin 3mW/pin Wireless Superconnect (WSC) Interface Scheme," IEEE International Solid-State Circuits Conference, ISCC 2003 / Session 10 / High Speed Building Blocks / Paper 10.7.
Mick, S. et al., "4 Gbps High-Density AC Coupled Interconnection," IEEE Custom Integrated Circuits Conference, pp. 133-140, 2002.

* cited by examiner

*Primary Examiner*—Anh Q Tran
(74) *Attorney, Agent, or Firm*—Lisa K. Jorgenson; Robert Iannucci; Seed IP Law Group PLLC

(57) ABSTRACT

A communication system for the connection between timing non-correlated synchronous devices comprising at least one transmitter and one receiver inserted between a first and a second voltage reference and connected to each other through a transmission channel in correspondence with respective transmitting and receiving terminals Advantageously, the receiver comprises at least one asynchronous input stage suitable for receiving on the receiving terminal a datum and associated with a synchronous output stage suitable for transmitting this datum in a synchronized way with a clock signal on a synchronized receiving terminal. A method transmits a datum from a transmitter to a receiver interconnected by a capacitive channel in a communication system for the connection between independently clocked devices.

31 Claims, 6 Drawing Sheets

COMMUNICATION SYSTEM FOR CONNECTING SYNCHRONOUS DEVICES THAT ARE UNCORRELATED IN TIME

BACKGROUND

1. Technical Field

The present invention relates to a communication system between independently clocked devices, in particular chips.

The invention particularly, but not exclusively, relates to a chip-to-chip communication system for a stacked device, i.e., a device comprising at least two chips assembled in a three-dimensional (3D) stacking configuration and the following description is made with reference to this field of application for convenience of explanation only.

2. Description of the Related Art

As it is well known, the development of stacking technology for heterogeneous device integration has recently increased in importance.

Stacking of chips, in which two or more integrated circuits or ICs of different types are placed one on the top of the other in a same package, is an alternative to silicon integration and provides improvements at the system design level in terms of size, cost, speed, power consumption and ease of application for a wide variety of products.

However, a successful implementation of the stacking or 3D technology deals with state-of-the-art of assembly processes such as wafer back-grinding, handling, die attach, wirebond and alignment. So, the choice of a stacking or 3D technology depends largely on the application of the final chip to be obtained.

It should be also emphasized that a correct and enhanced chip-to-chip communication in a stacked device is a fundamental feature to be guaranteed, in particular in the scenario of the so-called Systems-on-Chip and Systems-in-Package.

In fact, by stacking integrated circuits or silicon structures within a same package and ensuring a communication between them can enhance the overall performances of a digital system comprising such structures, as described in the article to Kaustav B. et al. entitled: "3-D ICs: A Novel Chip Design for Improving Deep-Submicrometer Interconnect Performance and Systems-on-Chip Integration", *Proceedings of the IEEE*, 89(5):602-633, May 2001.

Moreover, the data vertical communication using AC interconnection of the wireless type has been recently presented as a stacking or 3D technology really promising for wide band and high speed applications, as described in the article to Kanda K. et al. entitled "1.27 Gb/s/pin 3 mW/pin wireless superconnect wsc interface scheme", *ISSCC Dig. Tech. Papers, pp.* 186-187, February 2003. Another vertical data communication system using an AC coupled interconnection is described in the article to Mick et al. entitled: "4 GBps High Density AC coupled Interconnection", *CICC* 2002.

It is also known from the article to R. J. Drost et al. entitled: "Proximity Communication", *IEEE J. Solid-State Circuits*, 39(9):1529-1535, Sep 2004, a prototype based on the vertical communication.

In this field, synchronization is a key issue for modern integrated systems where the distribution of a global clock signal is not possible or not advisable given the complexity of the systems themselves. In particular, the so-called Globally Asynchronous Locally Synchronous (GALS) approach is important for application to 3D communication systems where clock transmission can be a difficult task at extremely high frequencies but where communication occurs through sampled inter-chip packets.

A chip-to-chip vertical communication system, based on contactless IO schemes exploiting capacitive coupling as an inter-chip channel, is shown for instance in FIG. 1. In particular, an upper metal layer of the technology process manufacturing the system is used to form a capacitive channel with the interposition of a dielectric, the chip-to-chip communication system being globally indicated at 1 and hereinafter briefly called the system 1.

As shown in FIG. 1, the system 1 comprises a plurality of communication units 2, each comprising a transmitter 3 and a receiver 4.

In particular, the transmitter 3 resides on a first chip A and the receiver 4 resides on a second chip B, the first and second chips A and B being assembled in a stacked or 3D configuration, the first chip A being on the top of chip B and the transmitter 3 and the receiver 4 being positioned on respective facing surfaces of the chips A and B, more particularly the transmitter 3 on a bottom surface of the chip A and the receiver 4 on a top surface of the chip B, with reference to an XYZ axis-system as shown in FIG. 1. Obviously, the above configuration (transmitter 3-chip A; receiver 4-chip B) is considered only as an example, a reverse configuration (transmitter 3-chip B; receiver 4-chip A) being also possible, the same consideration applying.

It should be emphasized that this approach benefits from on-chip communication circuits able to guarantee high performances, low power dissipation and reliable flexibility in data exchange.

A chip-to-chip communication system, providing pre-charge and evaluation blocks within a transmitter TX and a receiver RX of the system, such transmitter and receiver having clock signals derived from a common clock signal is also described in the US Published Patent Application No. 2007/092011 and schematically shown in FIGS. 2A and 2B.

The system 10 comprises the transmitter TX 11 and the receiver RX 12, connected to each other through a connection block 15. The connection block 15 is an inter-chip communication channel.

In particular, the transmitter TX 11 has an output terminal TXout connected to an input terminal RXin of the receiver RX 12 through the connection block 15.

The connection block 15 could be a capacitive connection block, as shown in FIG. 2A or an ohmic connection block, as shown in FIG. 2B.

The transmitter TX 11 also has an input terminal TXin receiving an input or data signal D. In a similar manner, the receiver RX 12 also has an output terminal RXout issuing an output signal Q. In particular, the input data signal D and the output signal Q are n-bit digital signals.

Furthermore, the receiver RX 12 is connected to a first terminal G, the reference G being indifferently used to indicate the terminal or the signal applied thereto, for sake of simplicity of description. In particular, G is the primary clock signal/terminal.

Also, the transmitter TX 11 is connected to a second terminal CP as well as to a third terminal SD, also in this case the references CP and SD being indifferently used to indicate the terminals or the signals applied thereto, for sake of simplicity of description. In particular, CP is the secondary clock signal/terminal and SD is the preset signal/terminal.

The first and second control terminals, G and CP, are connected to each other at the connection block 15 through a first 13 and a second buffer 14.

As already indicated, the transmitter TX 11 is associated with a first chip, conventionally indicated as chip A, referring back to FIG. 1, while the receiver RX 12 is associated with a second chip, conventionally indicated as chip B, the first and second chips, A and B, being assembled in a stacked or 3D configuration.

The primary clock signal G and the secondary clock signal CP are balanced clock trees used to synchronize a bus of the input data signal D. In particular, the primary clock signal G and the secondary clock signal CP are obtained by a same clock signal. In the example shown in FIGS. 2A and 2B, the secondary clock signal CP is the transmitter clock signal which is delayed with respect to the primary clock signal G, which is in turn the receiver clock signal. In this way, the secondary clock signal CP guarantees a correct functional synchronization between the transmitter TX 11 and the receiver RX 12, i.e., between the chips A and B. In order to achieve that, the clock signal is transmitted in the opposite direction of the input data signal D, i.e., from the data receiver chip B to the data transmitter chip A.

So, the input data signal D flows from the first chip A to the second chip B, while the clock signals CP and G flow from the second chip B to the first chip A. In summary, the input data signal D and the clock signals CP and G flow in opposite directions.

While advantageous under several aspects, also this known system uses a dedicated clock channel apt to make the two chips isochronal and in phase to each other in order to ensure a correct working.

BRIEF SUMMARY

One embodiment is a synchronizer for a chip-to-chip or 3D communication system having structural and functional characteristics which allows to eliminate the need of a common clock signal transmission or the use of a dedicated clock channel, without requiring the use of synchronizers inside the system itself, thus overcoming the limits which still affect the devices realized according to the prior art and allowing in this way the use of distinct and not related (and thus not iso-frequency) clock domains between 3D stacked chips.

One embodiment is a communication system for the connection between timing non-correlated or also independently clocked synchronous devices, in particular chip-to-chip or 3D, comprising a transmitter and a receiver connected through a channel of the capacitive or resistive type, the receiver being of the self-synchronized type and having at least one asynchronous input stage combined with a synchronous output stage so as to allow the reception of a datum transmitted at any time and to ensure its transmission in a synchronized way with respect to a clock signal.

From now on, for convenience of explanation, reference will be made for the present description to a capacitive channel, however similar considerations and results can also be obtained considering a channel of the resistive type.

One embodiment is a communication system of the type comprising at least one transmitter and one receiver inserted between a first and a second voltage reference and connected to each other through a transmission channel in correspondence with respective transmitting and receiving terminals. The receiver comprises at least one asynchronous input stage suitable for receiving on said receiving terminal a datum and associated with a synchronous output stage suitable for transmitting said datum in a synchronized way with a clock signal on a synchronized receiving terminal.

Advantageously, said receiver further comprises a feedback block connected between said synchronized receiving terminal and a feedback node, in turn connected to said asynchronous input stage.

In particular, said asynchronous input stage comprises a first and a second high impedance stage having respective control terminals connected to said feedback node, said first high impedance stage being inserted between said first voltage reference and said receiving terminal, while said second high impedance stage is inserted between said receiving terminal and said second voltage reference, said high impedance stages being suitable for holding a correct voltage value at said receiving terminal supplying it with suitable under-threshold currents under high impedance conditions.

In a preferred embodiment of the communication system, said transmitter is a charge pump transmitter suitable for compensating signal degradations caused by capacitive partitions which characterize the communication channel.

Suitably, said charge pump transmitter comprises at least one charge pump capacitor suitable for injecting additional charge into said transmitting terminal.

Further advantageously, said charge pump transmitter comprises at least one driving section and one switching section interconnected through said charge pump capacitor.

The problem is also solved by a communication system of the bidirectional type and comprising at least one pair of reception and transmission blocks, each block comprising at least:

one transmitter inserted between an input terminal and an interconnection terminal with the capacitive channel and having an enable terminal receiving an additional driving signal; and a receiver connected to said interconnection terminal through a pass-gate transistor and having an output terminal whereon said datum transmitted in a synchronized way with respect to said clock signal received from a clock terminal is presented.

One embodiment is a method for transmitting a datum from a transmitter to a receiver interconnected by a capacitive channel in a communication system for the connection between timing non-correlated or also independently clocked synchronous devices, the method comprising the steps of:

reception of a datum in the form of a voltage signal;

transmission of said datum by said transmitter on a transmitting terminal thereof;

reception of said datum through said capacitive channel on a receiving terminal of said receiver; and transmission of said datum on a synchronized receiving terminal of said receiver, wherein said step of reception of said datum on said receiving terminal comprises a high impedance biasing step of said receiving terminal itself and said step of transmission of said datum on said synchronized receiving terminal comprises a synchronization step of said datum with a clock signal.

Suitably, said high impedance biasing step occurs through its connection to at least one first and one second high impedance stage and said synchronization step comprises a storage step of said datum in suitable latches, configured in a similar way and connected to a negated value of said clock signal and to said clock signal, respectively.

The characteristics and advantages of the communication system and method will be apparent from the following description of an embodiment thereof given by way of indicative and non-limiting example with reference to the annexed drawings.

DETAILED DESCRIPTION

Figure 1:
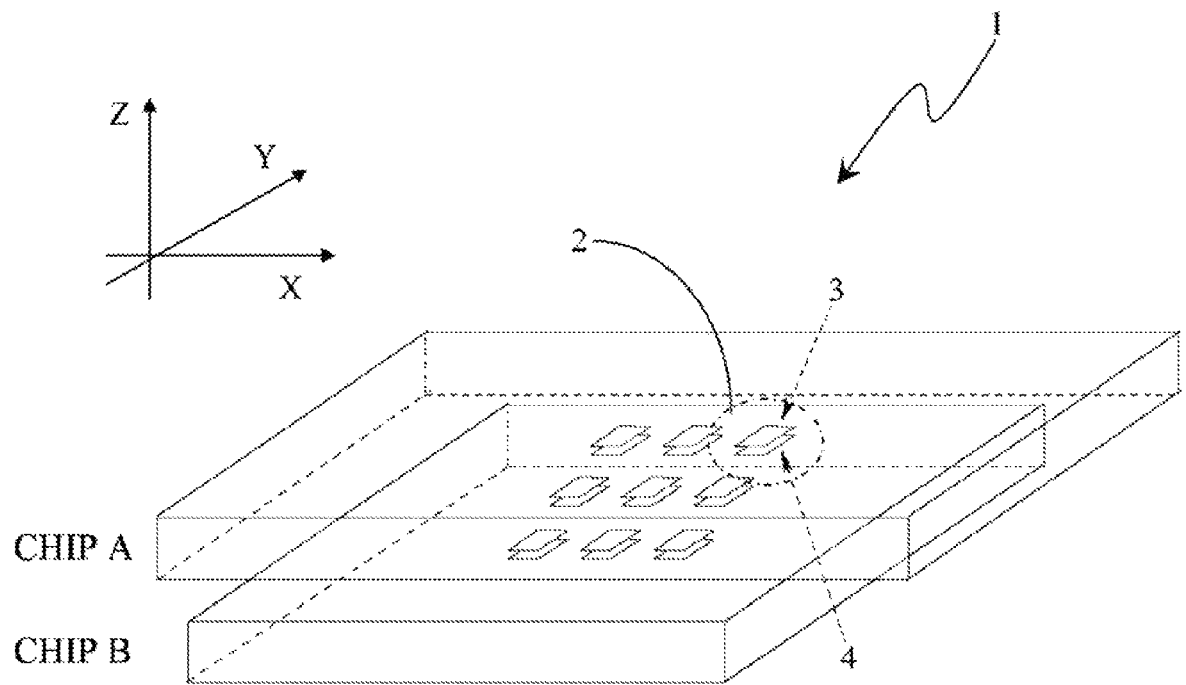
FIG. 1 shows a general scheme of a chip-to-chip communication system.
Figure 2A:
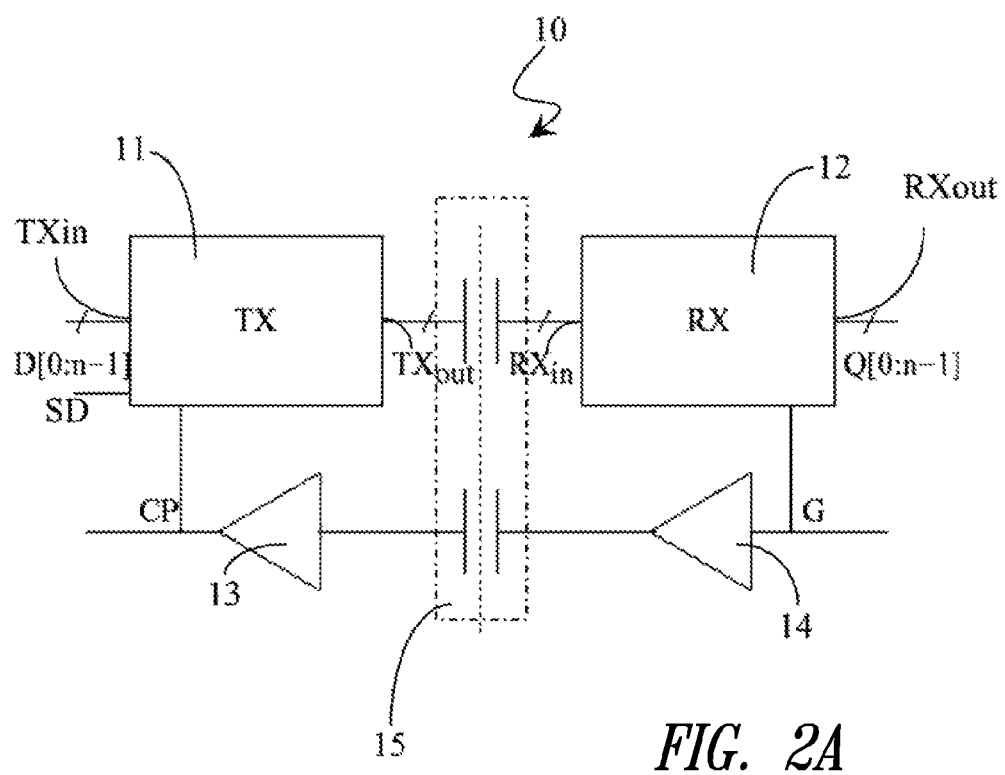
FIGS. 2A and 2B schematically show a chip-to-chip communication system realized according to the prior art.
Figure 2B:
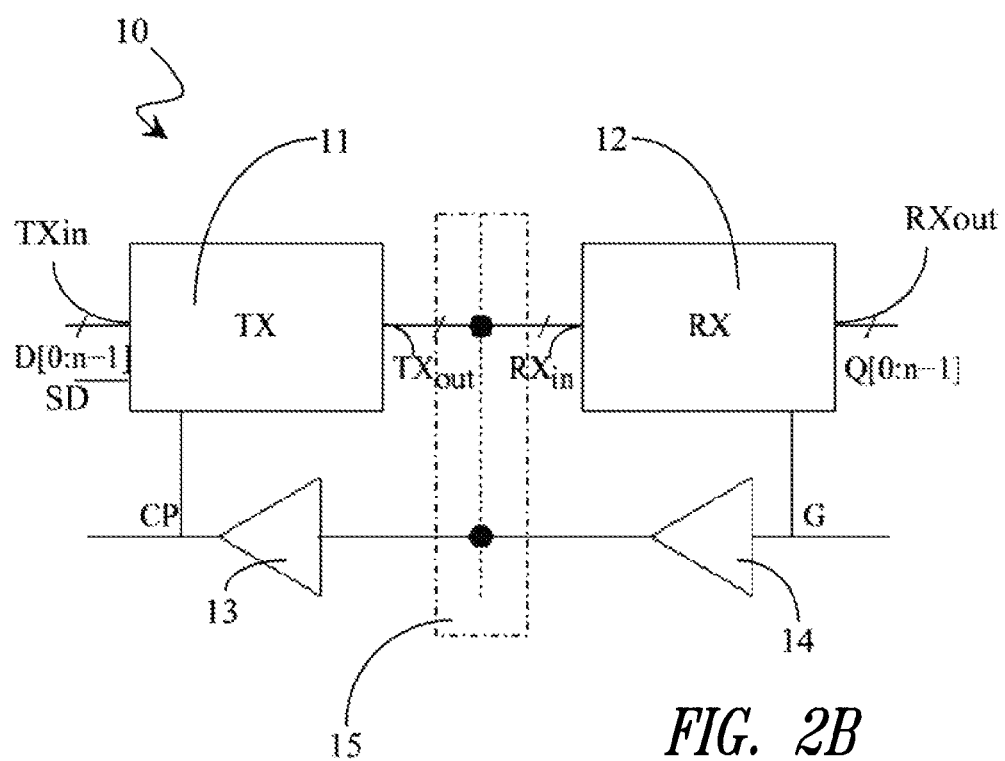
Figure 3:
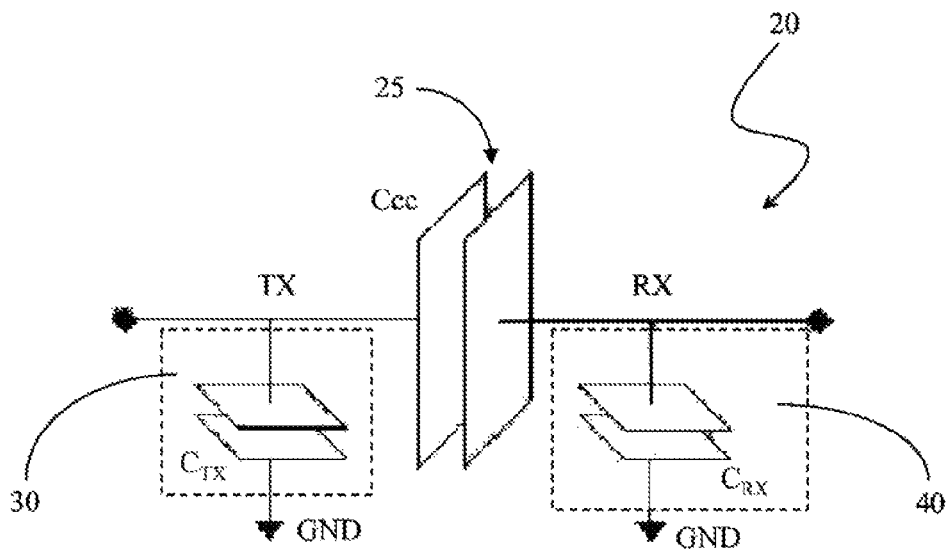
FIG. 3 schematically shows a general scheme of a communication channel pattern of the capacitive type.

With reference to these figures, and in particular to FIG. 3, a communication system 20 includes a capacitive communication channel 25 for the connection between devices 30, 40, in particular chips.

In particular, the channel 25 connects a transmitter 30 and a receiver 40, for which FIG. 3 only shows the transmitting TX and receiving RX terminals and the equivalent capacitances $C_{TX}$ and $C_{RX}$, respectively, connected between these terminals and the ground GND.

Advantageously, the receiver 40 as used is of the self-synchronized type.

In particular, the receiver 40 comprises an asynchronous input stage associated with a synchronous output stage so as to allow the reception of a datum D transmitted by the transmitter at any time and also ensuring a transmission thereof which is synchronized with the clock signal CP of the receiver itself.

In this context, as it will be apparent hereafter in the description, the word self-synchronized means that no clock signal is to be shared by transmitters and receivers of an inter-chip communication system and that it is not necessary to provide a synchronizer to be inserted in these transmitters and receivers to manage the correct overlapping of the clock phases of the interconnected chips.

Figure 4:
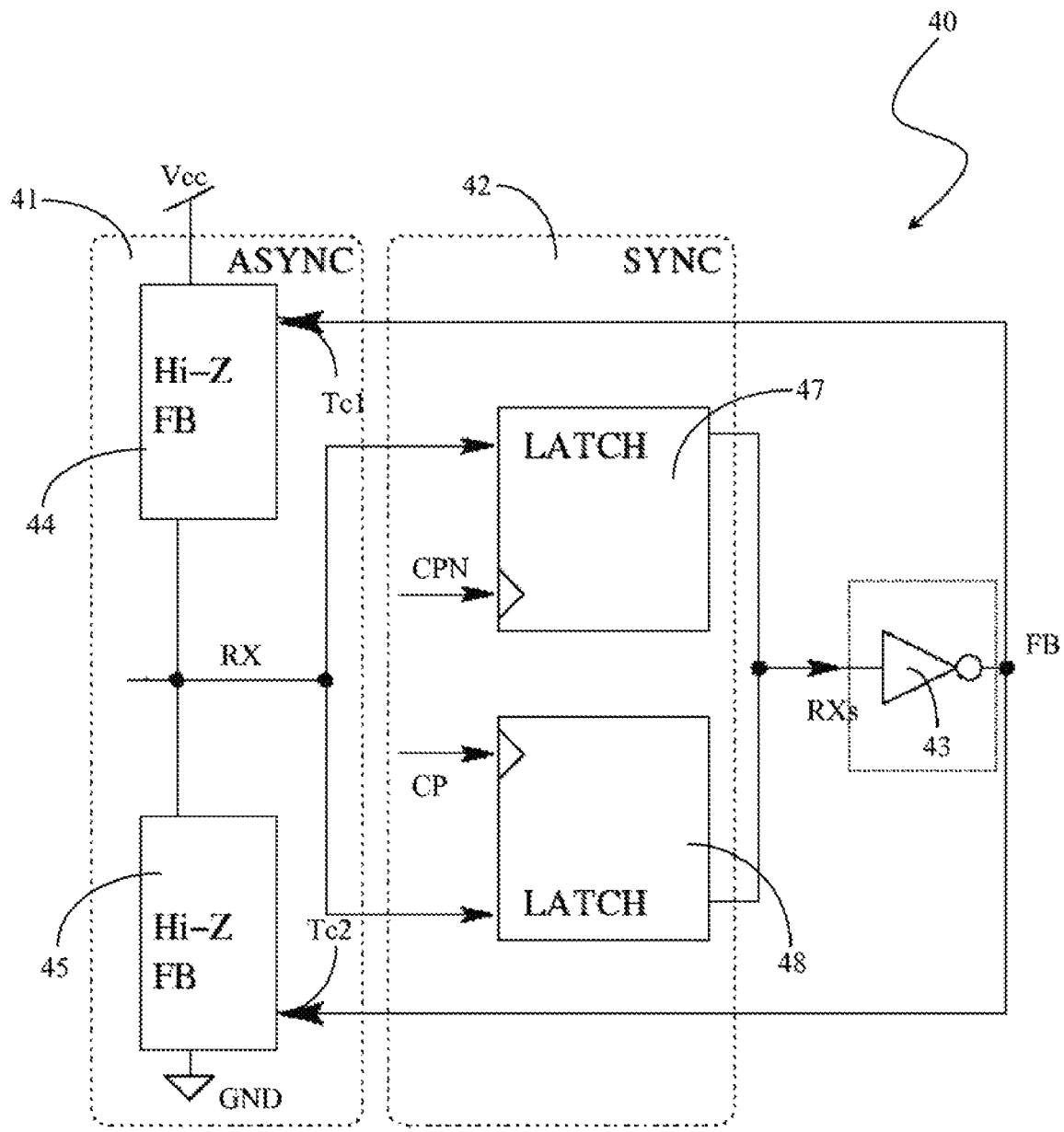
FIG. 4 schematically shows an asynchronous receiver realized according to the present disclosure.

A receiver realized according to the present disclosure is schematically shown in FIG. 4, globally indicated with 40.

The receiver 40 comprises an asynchronous input stage 41 inserted between a supply voltage reference Vcc and the ground GND and connected to an input terminal or receiving terminal RX, as well as a synchronous output stage 42, in turn inserted between the receiving terminal RX and a synchronized receiving terminal RXs. Finally, the receiver 40 comprises a feedback block 43 connected between the synchronized receiving terminal RXs and a feedback node FB, in turn connected to the asynchronous input stage 41. It is also to be noted that the feedback block 43 also comprises a part of the asynchronous section of the receiver 40.

More in detail, the asynchronous input stage 41 comprises a first 44 and a second high impedance and feedback stage 45, symmetrical to each other and having respective control terminals, Tc1 and Tc2, connected to the feedback node FB. In particular, the first high impedance and feedback stage 44 is inserted between the supply voltage reference Vcc and the receiving terminal RX, while the second high impedance and feedback stage 45 is inserted between the receiving terminal RX and the ground GND.

Further, the synchronous output stage 42 comprises a first 47 and a second latch 48 having respective first input terminals connected to the receiving terminals RX, second input terminals receiving a negated value CPN of the clock signal and the clock signal CP, respectively, and output terminals connected to each other and to the synchronized receiving terminal RXs.

The first and second high impedance stages, 44 and 45, hold a correct voltage value at the input node they are connected to, i.e., at the receiving terminal RX. In particular, these stages supply this node with suitable under-threshold currents.

The synchronous output stage 42 is more exactly a synchronizing stage comprising the two latches 47 and 48, in particular of the almost-tspc (acronym of the English: "true single phase clock") type.

The synchronization stage is called self-synchronizing according to the possibility of reading the datum at the receiving terminal RX independently from the time relation between the clock signal of the transmitter and that of the receiver.

Suitably the latches 47 and 48 are clocked by the system clock signal CP and by its negated value CPN. In this way, when a latch is under evaluation, the other is disabled (with output in high impedance), avoiding any electric conflict on the output node they are connected to, i.e., the synchronized receiving terminal RXs. Moreover, the logic value at the synchronized receiving terminal RXs reflects the value received on the receiving terminal RX, under both rising and falling edge conditions of the clock signal CP itself, the sampling time between the receiving terminal RX and the synchronized receiving terminal RXs being at the best equal to half of the clock period.

The high impedance condition for the receiving terminal RX is thus always ensured thanks to the high impedance stages, 44 and 45, of the asynchronous input stage 41 connected to this receiving terminal RX, thus allowing to receive a datum D at any time, without problems of synchronization with the transmitter 30. The datum outputting from the receiver 40 onto the synchronized receiving terminal RXs is synchronized with the clock signal CP thanks to the synchronous output stage 42.

Figure 5:
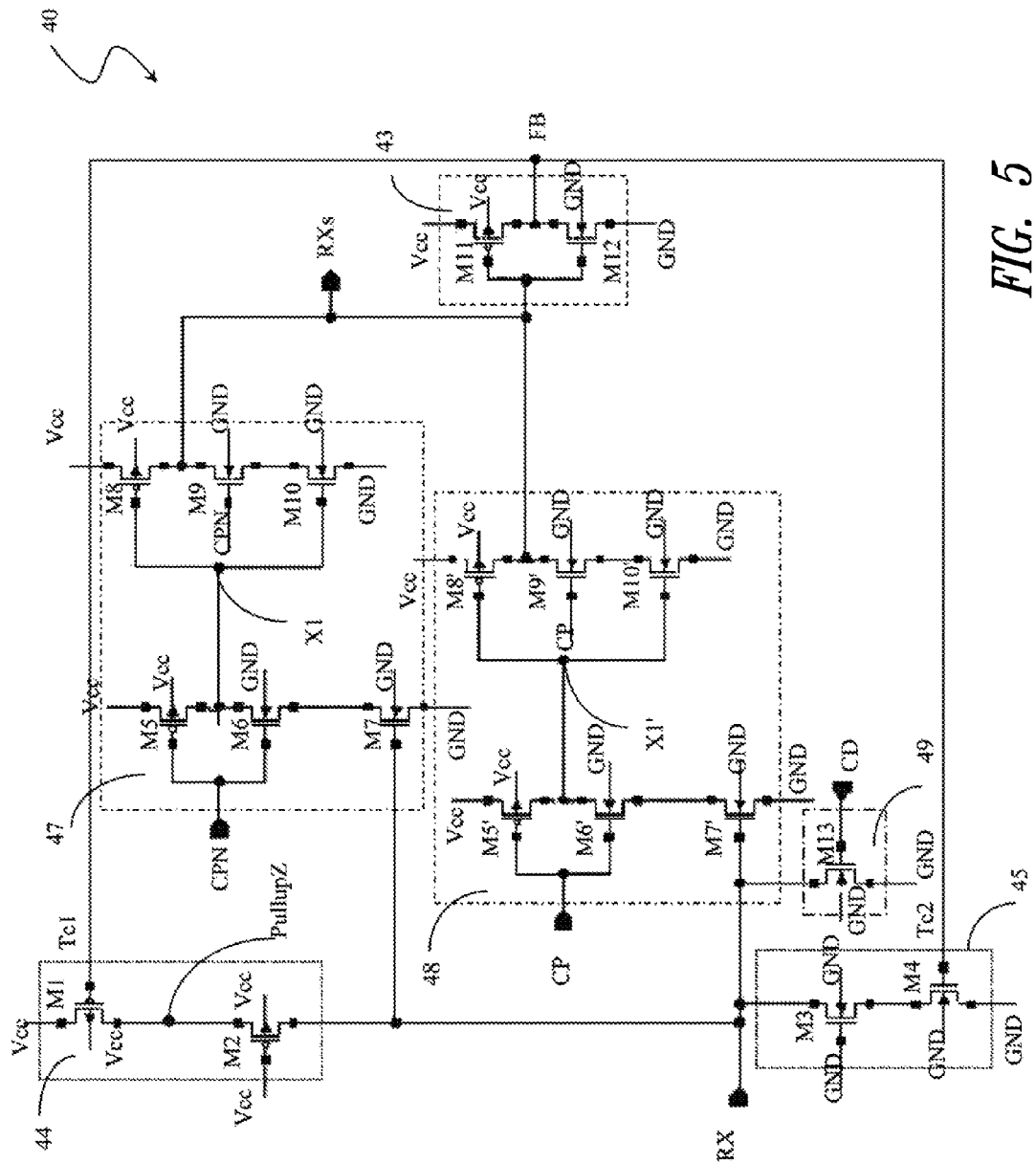
FIG. 5 schematically shows a circuit scheme of an embodiment of the self-synchronized receiver realized according to the present disclosure.

A preferred embodiment of the receiver 40 is schematically shown in FIG. 5.

As seen, the receiver 40 comprises the first 44 and the second feedback stage 45, symmetrical to each other and having respective control terminals, Tc1 and Tc2, connected to the feedback node FB. In particular, in the embodiment shown in FIG. 5, the first feedback stage 44 comprises a first and a second transistor, M1 and M2, inserted, in series with each other, between the supply voltage reference and the receiving terminal RX.

More in particular, the first transistor M1 is a P channel MOS transistor having a control or gate terminal realizing the first control terminal Tc1 and a bulk terminal connected to the supply voltage reference Vcc while the second transistor M2 is a P channel MOS transistor having a control or gate terminal and a bulk terminal connected to the supply voltage reference Vcc and a drain terminal connected to the receiving terminal RX.

In a fully symmetrical way, the second feedback stage 45 comprises a third and a fourth transistor, M3 and M4, inserted, in series with each other, between the receiving terminal RX and the ground GND.

More in particular, the third transistor M1 is an N channel MOS transistor having a control or gate terminal and a bulk terminal connected to the ground GND and a drain terminal connected to the receiving terminal RX while the fourth transistor M4 is an N channel MOS transistor having a control or gate terminal realizing the second control terminal Tc2 and a bulk terminal connected to the ground GND.

It is to be noted that the second and third transistors, M2 and M3, having the drain terminals connected to the receiving terminal RX, are always reverse biased or locked and allow to store the datum present on this receiving terminal RX under high impedance conditions, thanks to the leakage currents flowing through them, which depend also on the state of the transistors M1 and M4.

In particular the realization of these first and second feedback stages, 44 and 45, implies the use of both MOS transistors having high leakage currents (in particular the transistors M2 and M3) and MOS transistors having low leakage currents (in particular, the transistors M1 and M4). In this way if the first transistor M1 is active, then the fourth transistor M4 will be reverse biased: the interconnection node pullupZ of the first and of the second transistor, M1 and M2, is at the supply voltage value Vcc and the current supplied by the first feedback stage 44 will be all that which flows through the second transistor M2 (which is a MOS transistor having high leakage currents) while that drawn by the second feedback stage 45 will be characterized by the crossing of the series of the transistors M3 and M4, and thus will be limited by the fourth transistor M4 (which is a MOS transistor having low leakage currents).

In this way a high logic voltage value previously received is held on the receiving terminal RX.

Naturally, as it will be obvious for the technician of the field, the dual reasoning is also valid, necessary to hold a low logic value on this receiving terminal RX.

It is again underlined that the high impedance condition always ensured for the receiving terminal RX is an important feature of the receiver 40 to allow the reception of the datum D at any time, without synchronization problems with the transmitter 30.

Suitably, the receiver 40 also comprises the first and second latches, 47 and 48, suitably synchronized by the clock signal CP and by its negated value CPN.

In particular, the first latch 47 comprises a fifth M5, a sixth M6 and a seventh transistor M7 inserted, in series with each other, between the supply voltage reference Vcc and the ground GND. In particular;

the fifth transistor M5 is a P channel MOS transistor inserted between the supply voltage reference Vcc and a first inner circuit node X1 and having a bulk terminal connected to the supply voltage reference Vcc;

the sixth transistor M6 is an N channel MOS transistor inserted between the first inner circuit node X1 and the seventh transistor M7 and having a bulk terminal connected to the ground GND; and the seventh transistor M7 is an N channel MOS transistor inserted between the sixth transistor M6 and the ground GND and having a bulk terminal connected to the ground GND.

Suitably, the fifth and sixth transistors, M5 and M6, have control or gate terminals connected to each other and receiving the negated value CPN of the clock signal, while the seventh transistor M7 has a control or gate terminal connected to the receiving terminal RX.

The first latch 47 also comprises an eighth M8, a ninth M9 and a tenth transistor M10 inserted, in series with each other, between the supply voltage reference Vcc and the ground GND and connected between the first inner circuit node X1 and the synchronized receiving terminal RXs. In particular;

the eighth transistor M8 is a P channel MOS transistor inserted between the supply voltage reference Vcc and the synchronized receiving terminal RXs and having a bulk terminal connected to the supply voltage reference Vcc;

the ninth transistor M9 is an N channel MOS transistor inserted between the synchronized receiving terminal RXs and the tenth transistor M10 and having a bulk terminal connected to the ground GND; and the tenth transistor M10 is an N channel MOS transistor inserted between the ninth transistor M9 and the ground GND and having a bulk terminal connected to the ground GND.

Suitably, the eighth and tenth transistors, M8 and M10, have control or gate terminals connected to each other and to the first inner circuit node X1, while the ninth transistor M9 has a control or gate terminal receiving the negated value CPN of the clock signal.

The second latch 48 has the same circuit configuration of the first latch 47 and the transistors therein comprised have been indicated with the same alphanumeric references with respect to the transistors of the first latch 47, followed by an apostrophe.

In this case, the fifth and the sixth transistor, M5' and M6', as well as the ninth transistor M9' receive the clock signal CP on their control or gate terminals.

The receiver 40 shown in FIG. 5 also comprises a feedback block 43 formed by a CMOS logic inverter realized by a P channel MOS transistor, M11, and by an N channel MOS transistor, M12, inserted, in series with each other, between the supply voltage reference Vcc and the ground GND, interconnected in correspondence with the feedback node FB and having respective control or gate terminals connected to each other and to the synchronized receiving terminal RXs. In particular, the P channel MOS transistor M11 has its bulk terminal connected to the supply voltage reference and the N channel MOS transistor M12 has its bulk terminal connected to the ground GND.

Finally, the receiver 40 shown in FIG. 5 comprises an enable block 49, inserted between the receiving terminal RX and the ground GND and realized by an enable transistor M13, in particular an N channel MOS transistor, having a control or gate terminal connected to an enable terminal CD suitable for supplying it with a reset signal, always indicated for convenience as CD.

It is important to underline that the receiver 40 according to the invention is enabled thanks to the reset signal CD but does not need a clock signal being synchronized with the transmitted packets or data, as also previously shown.

Let's now see the operation of the receiver 40 according to the invention in greater detail.

The symmetrical structure of the latches 47 and 48, connected in parallel between the receiving terminal RX and the synchronized receiving terminal RXs and synchronized by opposite signals, CP and CPN allow to have a value of a sampled datum available in both the edges of the clock signal CP of the receiver 40. More precisely, the high value (logic 1) is available on both the edges of the clock signal CP, while the low value (logic 0) is available on both the levels.

This value of sampled datum is then feedback supplied, thanks to the feedback block 43, to the asynchronous input stage 41 and in particular to the first and second feedback stages, 44 and 45.

Further advantageously according to a preferred embodiment, the transmitter 30 is a charge pump transmitter suitable for significantly helping the transmission of a signal in the capacitive channel 25.

Substantially, the charge pump transmitter 30 takes care of compensating a signal degradation caused by the capacitive partition occurring in correspondence with the receiving terminal RX, in particular by pumping charge in correspondence with the transmitting terminal TX, thus improving the performances of the communication system 20 as a whole.

The charge pulse is used in the transmission of a logic value '1' (when considering a reset starting step in which the transmitted and received values are held at a logic value '0'), for helping its correct detection, compensating a possible signal degradation caused by the capacitive partition on the receiving terminal RX.

It then immediately occurs that a fundamental feature of the charge pump transmitter 30 is its capacity of injecting charge or "boosting" the transmitting terminal TX (and, in consequence, the receiving terminal RX) as much as possible, although keeping the performances as for the frequency of a capacitive channel 25. In particular, a single cycle of the clock signal CP is enough to reach a voltage pulse level for the terminals TX and RX, no additional delay influencing the operation of the transmitter 30.

Figure 6:
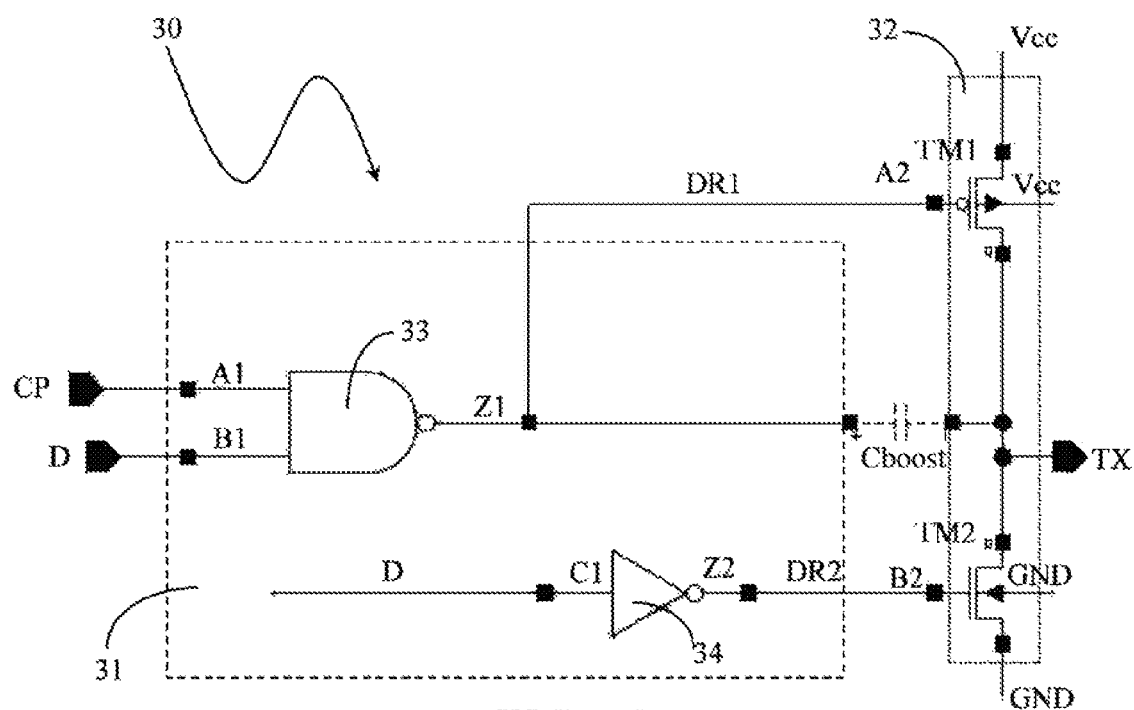
FIG. 6 schematically shows a circuit scheme of an embodiment of the charge pump based transmitter realized according to the present disclosure.

A preferred embodiment of the charge pump transmitter 30 is schematically shown in FIG. 6.

In particular, the transmitter 30 comprises a driving section 31 and a switching section 32 interconnected by means of a charge pump capacitor Cboost.

More in detail, the driving section 31 has a first input terminal A1 receiving a datum D to be transmitted and a second input terminal B1 receiving the clock signal CP, as well as a third input terminal Cl, also receiving the datum D to be transmitted. The driving section 31 also has a first output terminal Z1 connected to a terminal of the charge pump capacitor Cboost, as well as to a first input terminal A2 of the switching section 32 and supplying it with a first driving signal DR1, as well as a second output terminal Z2 connected to a second input terminal B2 of the switching section 32 and supplying it with a second driving signal DR2.

In particular, the driving section 31 comprises a NAND gate 33 having respective input terminals connected to the first and second input terminals, A1 and B1, as well as an output terminal connected to the first output terminal Z1 of the driving section 31. The driving section 31 also comprises a logic inverter 34 having an input terminal connected to the third input terminal C1 and an output terminal connected to the second output terminal Z2 of the driving section 31.

In this way, the first driving signal DR1 is the result of a logic NAND operation between the datum D to be transmitted and the clock signal CP, while the second driving signal DR2 is the result of a logic inversion of the datum D to be transmitted.

Furthermore, the switching section 32 comprises a first TM1 and a second switch TM2, in particular realized by MOS transistors, inserted in series with each other between the supply voltage reference Vcc and the ground GND and interconnected in correspondence with the output terminal of the transmitter 30, i.e., of the transmitting terminal TX. Suitably, the first and second switches, TM1 and TM2, have respective control terminals connected to the first and to the second output terminal, Z1 and Z2, of the driving section 31, respectively.

In the embodiment shown in FIG. 6, the first switch TM1 is in particular a P channel MOS transistor inserted between the supply voltage reference Vcc and the transmitting terminal TX, having a gate terminal realizing the first input terminal A2 of the switching section 32 and connected to the first output terminal Z1 of the driving section 31, as well as a bulk terminal connected to the supply voltage reference Vcc. Moreover, the second switch TM2 is in particular an N channel MOS transistor inserted between the transmitting terminal TX and the ground GND, having a gate terminal realizing the second input terminal B2 of the switching section 32 and connected to the second output terminal Z2 of the driving section 31, as well as a bulk terminal connected to the ground GND.

The transmitter 30 also comprises a charge pump capacitor Cboost inserted between the first output terminal Z1 of the driving section 31 and the transmitting terminal TX.

It is then immediate to verify that the transmitter 30 shown in FIG. 6 operates as follows:
- when the datum D to be transmitted has a low logic value or '0' (D='0'), the transmitting terminal TX is held at a low logic level (TX='0');
- when the datum D to be transmitted has a high logic value or '1' and a high half-period of the clock signal CP starts (D='1' and CP='1') the first driving signal DR1 moves to a low logic value (DR1='0') and triggers a pre-charge phase of the transmitting terminal TX which then reaches a high logic value (TX='1');
- when a low half-period of the clock signal CP starts, the datum D to be transmitted being always a high logic value (D='1' and CP='0'), the first driving signal DR1 rises to a high logic value (DR1='1'), forcing an additional rising transition for the transmitting terminal TX thanks to the charge pump capacitor Cboost which is connected between the first output terminal Z1 (whereon the first driving signal DR1 is present) and the transmitting terminal TX itself. In this way, the value of the voltage at the transmitting terminal TX rises above the high logic value (TX='1+') and an output overvoltage occurs with respect to the supply voltage value Vcc.

In this way the charge pump transmitter 30, thanks to suitable connections between the charge pump capacitor Cboost and the transmitting terminal TX, injects charge or "boosts" the transmitting terminal TX itself, although keeping the performances as for the frequency of a capacitive channel 25, the charge boost occurring in a single cycle of the clock signal CP.

It is also to be noted that the input node of the receiver 40, i.e., the receiving terminal RX, accesses the gate terminals of two n-MOS transistors only. For this reason, the voltage variation on this receiving terminal RX exceeding a voltage value equal to a threshold voltage of an N channel MOS transistor ensures the correct operation of the receiver 40 and thus of the system as proposed.

Finally, it is immediate to verify that the receiver 40 can be used as an up/down level shifter and at the same time as synchronizer between two different clock domains, the transmission and reception circuits being placed on distinct chips and potentially characterized by non-correlated clock domains and supplies.

Figure 7:
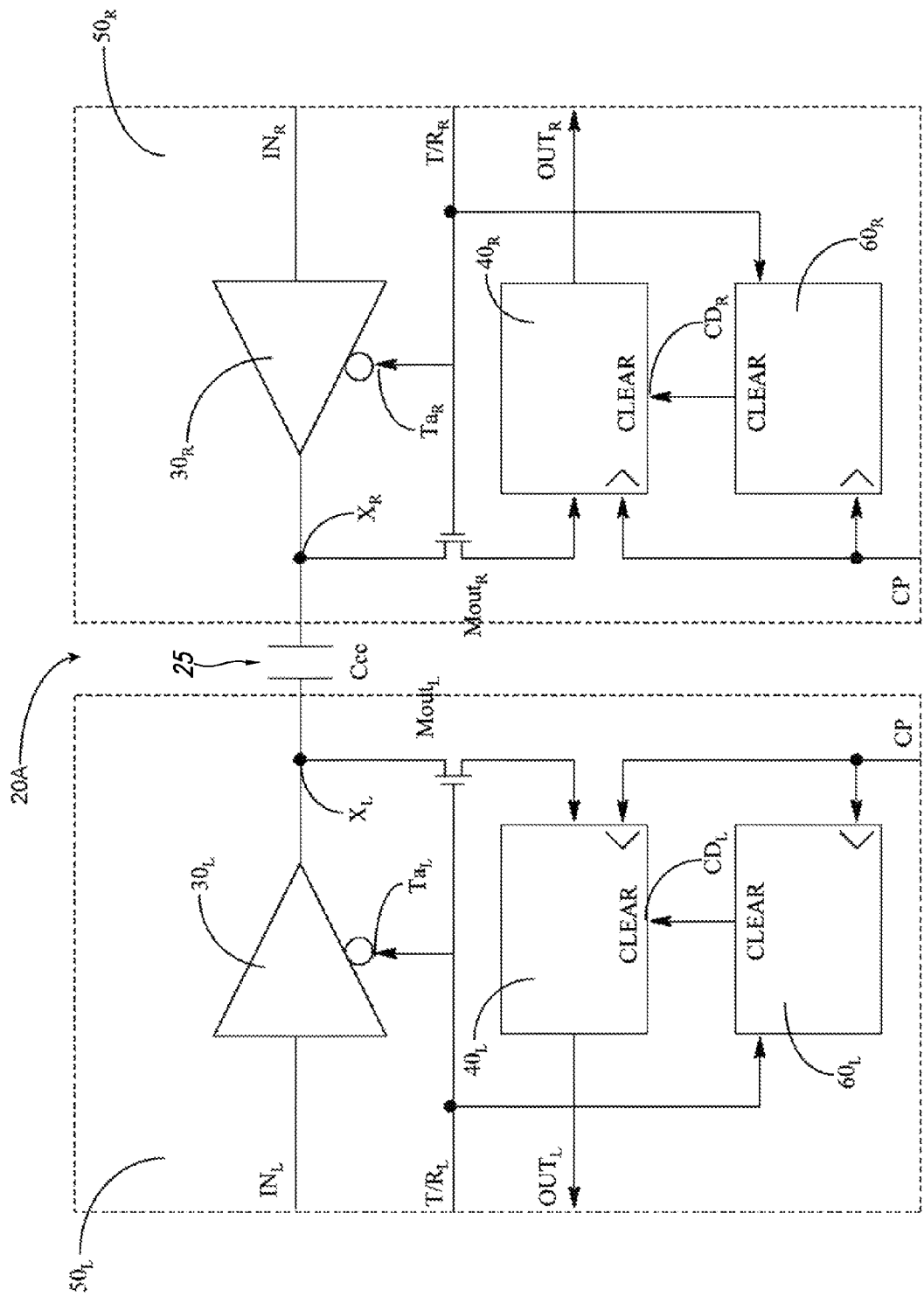
FIG. 7 schematically shows a further bidirectional embodiment of the communication system realized according to the present disclosure.

One embodiment is an inter-chip communication system of the bidirectional type, according to a further embodiment schematically shown in FIG. 7, this bidirectional embodiment being indicated with 20A.

In this case, the system 20A comprises two reception and transmission blocks 50, in particular a right reception and transmission block $50^R$ and a left reception and transmission block $50_L$, interconnected by the capacitive channel represented by the channel capacitor $C_{cc}$. Corresponding elements in the two reception and transmission blocks have been indicated with the same alphanumeric reference numbers, followed by the subscripts R and L for indicating elements of the right and left blocks respectively.

In particular, this reception and transmission block 50L,R comprises a transmitter $30_{L,R}$ inserted between an input terminal $IN_{L,R}$ and a terminal $X_{L,R}$ Of interconnection with the channel capacitor $C_{cc}$. Suitably, the terminal $X_{L,R}$ is connected to the supply voltage reference Vcc through a decoupling diode Dd.

The transmitter $30_{L,R}$ also has an enable terminal Ta receiving an additional driving signal T/R.

Suitably, the transmitter $30_{L,R}$ is a tri-state buffer driven by this additional driving signal T/R so as to ensure a high impedance condition on the interconnection terminal $X_{L,R}$ connected to the channel capacitor $C_{CC}$ when in reception mode.

The reception and transmission block $50_{L,R}$ also comprises a receiver $40_{L,R}$ connected to the terminal X of interconnection with the channel capacitor $C_{CC}$ by means of a pass-gate transistor $Mout_{L,R}$ and having an output terminal $OUT_{L,R}$ whereon the transmitted datum D is presented, as previously seen in asynchronous way with respect to the clock signal CP received by a clock terminal.

Suitably, the pass-gate transistor $Mout_{L,R}$ has a control or gate terminal receiving the additional driving signal T/R in such a way as to disconnect the receiver $40_{L,R}$ under transmission conditions.

The reception and transmission block $50_{L,R}$ also comprises a reset block $60_{L,R}$ receiving the additional driving signal $T/R_{L,R}$ and the clock signal CP and suitable for supplying the receiver 40 with a reset signal CLEAR.

In this bidirectional embodiment of the system 20A, the charge pump can be suitably substituted by a generic tri-state buffer, thus obtaining for the transmitting terminal TX a high impedance driving when the capacitive channel 25 should be enabled in reception mode and avoiding at the same time the additional capacitive charge of the charge pump capacitor Cboost inside the transmitter $30_{L,R}$.

The additional driving signal $T/R_{L,R}$ serves as enable signal of this tri-state buffer and allows at the same time to control the pass-gate transistor $Mout_{L,R}$ suitable for disconnecting the receiver $40_{L,R}$ from the remainder of the system 20A. This mechanism obviously operates also in a complementary way, so as to ensure a simultaneous enabling of the left transmitter $30_L$ and the right receiver $40_R$ and vice versa.

In its most general form, one embodiment is a method for transmitting a datum D from a transmitter 30 to a receiver 40 interconnected by means of a capacitive channel 25, the method comprising the steps of:
reception of a datum D in the form of a voltage signal;
transmission of the datum D by the transmitter 30 on a transmitting terminal TX thereof;
reception of the datum D through the capacitive channel 25 on a receiving terminal RX of the receiver 40; and
transmission of the datum D on a synchronized receiving terminal RXs of the receiver 40.

Advantageously, the step of reception of the datum D on the receiving terminal RX comprises a high impedance biasing step of the receiving terminal RX itself and the step of transmission of the datum D on the synchronized receiving terminal RXs comprises a synchronization step of this datum D with the clock signal CP.

Suitably, the high impedance biasing step of the receiving terminal RX of the receiver 40 occurs by connecting this receiving terminal RX to at least one first and one second high impedance stage, 44 and 45, respectively connected to the supply voltage reference Vcc and to the ground GND.

Moreover, this biasing step comprises a control step of these high impedance stages, 44 and 45, comprising a feedback phase of a signal at the synchronized receiving terminal RXs to respective control terminals, Tc1 and Tc2, of these high impedance stages, 44 and 45, this feedback being carried out by means of a feedback block 43 realized by a CMOS inverter.

Further advantageously, the synchronization step of the datum D comprises a storage step of this datum D in suitable latches, 47 and 48, configured in an analogous way and connected to the negated value CPN of the clock signal and to the clock signal CP, respectively, these latches being inserted between the receiving terminal RX and the synchronized receiving terminal RXs of the receiver 40.

In conclusion, the chip-to-chip or 3D communication system 20, comprising the above described transmitter 30 and receiver 40 and implementing the above described transmission method, solves the problem linked to the synchronous transmission of data, without requiring the transmission of a common clock signal or the use of a dedicated clock channel, as well as the use of inner synchronizers of the system itself, attaining at the same time several advantages.

In particular, the receiver 40 allows the reception of a datum D at any time and ensures its synchronized transmission with the clock signal CP thanks to the use of an asynchronous input stage associated with a synchronous output stage.

Further advantageously, the asynchronous input stage is symmetrically configured and comprises high impedance stages connected to the receiving terminal for always ensuring its high impedance condition and allowing the correct reception and storage of data under all the conditions. Moreover, the synchronous output stage ensures the transmission of the data received in a way which is synchronized with the clock signal, thanks to the use of latches having symmetrical structure, connected in parallel between the receiving terminal RX and the synchronized receiving terminal RXs and synchronized by the clock signal CP and by its negated value CPN, which thus make the data received in both the edges of the clock signal CP available.

Further advantageously, the system 20 comprises a charge pump transmitter suitable for significantly helping the transmission of a signal in the capacitive channel 25, in particular compensating a signal degradation caused by the capacitive partition and thus improving the performances of the communication system 20 as a whole.

In particular, the charge pump transmitter has the capacity of injecting charge or "boosting" the transmitting terminal TX (and, in consequence, the receiving terminal RX) as much as possible, while keeping the performances as for the frequency, a single cycle of the clock signal CP being enough to reach a voltage pulse level for the terminals TX and RX and no additional delay influencing its operation.

Advantageously, the receiver 40 operates when the voltage variation on the receiving terminal RX exceeds a voltage value equal to a threshold voltage of an N channel MOS transistor, this receiving terminal RX (which constitutes its input node) accessing the gate terminals of two n-MOS transistors only.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication system, comprising:
   a first device including a transmitter with a transmitting terminal;
   a second device that is not timing correlated with the first device, the second device including a receiver with a receiving terminal; and
   a transmitting channel coupled between the transmitting and receiving terminals, wherein said receiver comprises:
      an asynchronous input stage suitable for receiving on said receiving terminal a datum; and
      a synchronous output stage suitable for outputting said datum, synchronized with a clock signal, on a synchronized receiving terminal.

2. A communication system according to claim 1, wherein said receiver further comprises a feedback block coupled between said synchronized receiving terminal and a feedback node, in turn coupled to said asynchronous input stage.

3. A communication system according to claim 2, wherein said asynchronous input stage of said receiver comprises first and second high impedance and feedback stages having respective control terminals coupled to said feedback node, said first high impedance and feedback stage being coupled between a first voltage reference and said receiving terminal, and said second high impedance and feedback stage being coupled between said receiving terminal and a second voltage reference, said high impedance and feedback stages being suitable for holding a correct voltage value at said receiving terminal by supplying said receiving terminal with suitable under-threshold currents.

4. A communication system according to claim 3, wherein said synchronous output stage of said receiver comprises first and second latches having respective first input terminals connected to said receiving terminal, respective second input terminals configured to receive a negated value of a clock signal and said clock signal, respectively, and respective output terminals connected to each other and to said synchronized receiving terminal, so that when one of the latches is under evaluation, the other of the latches is disabled, avoiding any electric conflict on said synchronized receiving terminal where said datum, synchronized with said clock signal, is present.

5. A communication system according to claim 4, wherein said first and second latches are almost-tspc latches.

6. A communication system according to claim 3, wherein said first and second high impedance and feedback stages are symmetrical to each other, the first high impedance and feedback stage including first and second transistors coupled in series with each other, the second high impedance and feedback stage including third and fourth transistors coupled in series with each other and coupled in series with the first and second transistors between said first and second voltage references and said receiving terminal.

7. A communication system according to claim 6, wherein said second and third transistors are MOS transistors having high leakage currents and said first and fourth transistors are MOS transistors having low leakage currents.

8. A communication system according to claim 6, wherein said second and third transistors are directly connected to said receiving terminal and are reverse biased, the second transistor having control and bulk terminals coupled to said first voltage reference and the third transistor having control and bulk terminals coupled to said second voltage reference, allowing to store said datum at said receiving terminal under high impedance conditions, thanks to leakage currents passing through the second and third transistors.

9. A communication system according to claim 7, wherein said first and fourth transistors have respective control terminals realizing said first and second control terminals coupled to said feedback node.

10. A communication system according to claim 9, wherein:
   said synchronous output stage of said receiver comprises first and second latches having respective first input terminals connected to said receiving terminals, respective second input terminals receiving a negated value of a clock signal and said clock signal, respectively, and respective output terminals connected to each other and to said synchronized receiving terminal, so that when one of the latches is under evaluation, the other of the latches is disabled, avoiding any electric conflict on said synchronized receiving terminal where said datum being synchronized with said clock signal is present,
   said first latch includes:
      fifth, sixth, and seventh transistors coupled in series with each other between said first and second voltage references, said fifth and sixth transistors being interconnected in correspondence with a first inner circuit node and having respective control terminals coupled to each other and to a negated clock signal terminal, said seventh transistor having a control terminal coupled to said receiving terminal; and
      eighth, ninth, and tenth transistors coupled in series with each other between said first and second voltage references, said eighth and ninth transistors being interconnected in correspondence with said synchronized receiving terminal, said eighth and tenth transistors having respective control terminals connected to each other and to said first inner circuit node, said ninth transistor having a control terminal coupled to said negated clock signal terminal; and
   said second latch includes:
      eleventh, twelfth, and thirteenth transistors coupled in series with each other between said first and second voltage references, said eleventh and twelfth transistors being interconnected in correspondence with a second inner circuit node and having respective control terminals coupled to each other and to a clock signal terminal, said thirteenth transistor having a control terminal coupled to said receiving terminal; and
      fourteenth, fifteenth, and sixteenth transistors coupled in series with each other between said first and second voltage references, said fourteenth and fifteenth transistors being interconnected in correspondence with said synchronized receiving terminal, said fourteenth and sixteenth transistors having respective control terminals connected to each other and to said second inner circuit node, said fifteenth transistor having a control terminal coupled to said clock signal terminal.

11. A communication system according to claim 1, wherein said feedback block is formed by a CMOS logic inverter realized by a pair of transistors coupled, in series with each other, between first and second voltage references, interconnected in correspondence with said feedback node and having respective control terminals connected to each other and to said synchronized receiving terminal.

12. A communication system according to claim 1, further comprising an enable block coupled between said receiving terminal and a voltage reference and configured to receive a reset signal.

13. A communication system according to claim 12, wherein said enable block comprises an enable transistor having a control terminal configured to receive said reset signal.

14. A communication system according to claim 1, wherein said transmitter is a charge pump transmitter suitable for compensating signal degradations caused by capacitive partitions which characterize the communication system.

15. A communication system according to claim 14, wherein said charge pump transmitter comprises a charge pump capacitor suitable for injecting additional charge into said transmitting terminal.

16. A communication system according to claim 15, wherein said charge pump transmitter comprises a driving section and a switching section interconnected by said charge pump capacitor.

17. A communication system according to claim 16, wherein said driving section of said charge pump transmitter comprises:
a NAND gate having respective input terminals coupled to a first and a second input terminal receiving said datum and said clock signal, respectively, as well as an output terminal connected to a first output terminal, suitable for supplying a first driving signal to said switching section; and
a logic inverter having an input terminal connected to a third input terminal and receiving said datum and an output terminal connected to a second output terminal, suitable for supplying a second driving signal to the switching section.

18. A communication system according to claim 17, wherein said switching section of said charge pump transmitter comprises first and second switches coupled in series with each other between first and second voltage references, interconnected in correspondence with said transmitting terminal and having respective control terminals connected to said first and second output terminals of said driving section and configured to receive therefrom said first and second driving signals.

19. A communication system according to claim 1, wherein:
the first and second devices are bidirectional;
the transmitter of the first device is coupled between a first input terminal and a first interconnection terminal coupled to the transmitting channel, and has first enable terminal configured to receive a first driving signal;
the second device includes a transmitter coupled between a second input terminal and a second interconnection terminal coupled to the transmitting channel, and has a second enable terminal configured to receive a second driving signal;
the first device includes a receiver structured to transmit data in a synchronized way with respect to a clock signal; and
the first device includes a first pass-gate transistor coupled between the first interconnection terminal and the receiving terminal of the receiver of the first device.

20. A communication system according to claim 19, wherein said transmitter of the first device is a tri-state buffer configured to be driven by said first driving signal so as to ensure a high impedance condition on said first interconnection terminal when in reception mode.

21. A communication system according to claim 20, wherein said first pass-gate transistor has a control terminal configured to receive said first driving signal so as to disconnect said receiver of the first device under transmission conditions.

22. A communication system according to claim 21, wherein the first device includes a reset block configured to receive said first driving signal and said clock signal and supply a reset signal to said receiver of the first device.

23. A method comprising:
receiving at a transmitter a datum in the form of a voltage signal;
transmitting said datum by said transmitter on a transmitting channel;
receiving said datum through said transmitting channel on a receiving terminal of a receiver, the receiving including receiving said datum while high impedance biasing said receiving terminal;
producing a synchronized datum by synchronizing said received datum with a clock signal; and
outputting said synchronized datum on a synchronized receiving terminal of said receiver.

24. A method according to claim 23, wherein said high impedance biasing of said receiving terminal includes:
enabling a first high impedance stage, coupled to a first voltage reference, using a feedback signal fed back from said synchronized receiving terminal; and
disabling a second high impedance stage, coupled to a second voltage reference, using the feedback signal.

25. A method according to claim 24, wherein synchronizing said datum comprises storing said datum in suitable latches controlled by a negated value of said clock signal and said clock signal, respectively, said latches being coupled between said receiving terminal and said synchronized receiving terminal of said receiver.

26. A device for communicating via a transmitting channel with another device that is not timing correlated with the device, comprising:
a receiver that includes:
a receiving terminal;
an asynchronous input stage suitable for receiving on said receiving terminal a datum; and
a synchronous output stage suitable for outputting said datum, synchronized with a clock signal, on a synchronized receiving terminal.

27. A device according to claim 26, wherein said asynchronous input stage comprises first and second high impedance stages having respective control terminals coupled to said synchronized receiving terminal, said first high impedance stage being coupled between a first voltage reference and said receiving terminal, and said second high impedance and feedback stage being coupled between said receiving terminal and a second voltage reference, said high impedance stages being suitable for holding a correct voltage value at said receiving terminal by supplying said receiving terminal with suitable under-threshold currents.

28. A device according to claim 27, wherein said first high impedance and feedback stage includes first and second transistors coupled in series with each other between a first voltage reference and the receiving terminal and said second high impedance stage includes third and fourth transistors coupled in series with each other between a second voltage references and said receiving terminal.

29. A device according to claim 28, wherein said second and third transistors are MOS transistors having high leakage currents and said first and fourth transistors are MOS transistors having low leakage currents.

30. A device according to claim 26, wherein said synchronous output stage comprises first and second latches having respective first input terminals coupled to said receiving terminal, respective second input terminals configured to receive a negated value of a clock signal and said clock signal, respectively, and respective output terminals coupled to each other and to said synchronized receiving terminal, so that when one of the latches is under evaluation, the other of the latches is disabled, avoiding any electric conflict on said synchronized receiving terminal where said datum, synchronized with said clock signal, is present.

31. A device according to claim 26, further comprising a transmitter configured to transmit data to the other device via the transmitting channel.

* * * * *